United States Patent
Faruque et al.

(10) Patent No.: US 9,725,064 B1
(45) Date of Patent: Aug. 8, 2017

(54) VEHICLE AIRBAG INCLUDING HUB AND SEGMENTS EXTENDING RADIALLY FROM THE HUB

(71) Applicant: Ford Global Technologies, LLC, Dearborn, MI (US)

(72) Inventors: Mohammed Omar Faruque, Ann Arbor, MI (US); S. M. Iskander Farooq, Novi, MI (US); Dean M. Jaradi, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/016,622

(22) Filed: Feb. 5, 2016

(51) Int. Cl.
*B60R 21/232* (2011.01)
*B60R 21/214* (2011.01)
*B60R 21/2338* (2011.01)
*B60N 2/14* (2006.01)
*B60R 21/231* (2011.01)

(52) U.S. Cl.
CPC ............ *B60R 21/232* (2013.01); *B60N 2/143* (2013.01); *B60R 21/214* (2013.01); *B60R 21/2338* (2013.01); *B60R 2021/23161* (2013.01)

(58) Field of Classification Search
CPC . B60R 21/232; B60R 21/214; B60R 21/2338; B60R 2021/23161; B60R 2021/23153; B60R 2021/23107
See application file for complete search history.

(56) References Cited

U.S. PATENT DOCUMENTS

| 3,795,412 | A | * | 3/1974 | John ..................... B60R 21/08 180/274 |
| 5,222,761 | A | * | 6/1993 | Kaji ..................... B60R 21/017 280/730.2 |
| 5,470,103 | A | * | 11/1995 | Vaillancourt ......... B60R 21/214 280/730.1 |
| 5,775,726 | A | * | 7/1998 | Timothy ............... B60R 21/013 280/730.1 |
| 6,773,026 | B2 | | 8/2004 | Meyer |
| 7,222,877 | B2 | | 5/2007 | Wipasuramonton et al. |
| 8,353,529 | B2 | | 1/2013 | Tomitaka et al. |
| 8,403,358 | B2 | | 3/2013 | Choi et al. |
| 8,851,509 | B1 | | 10/2014 | Choi |
| 9,340,126 | B2 | | 5/2016 | Cuddihy et al. |

(Continued)

FOREIGN PATENT DOCUMENTS

| DE | 10039800 A1 * | 2/2002 | ........... B60R 21/214 |
| JP | 2016088413 A | 5/2016 | |
| WO | WO2004050435 A1 * | 6/2004 | ........... B60R 21/214 |

*Primary Examiner* — Drew J Brown
(74) *Attorney, Agent, or Firm* — Frank MacKenzie; Bejin Bieneman PLC (57) ABSTRACT

An airbag for a vehicle includes a hub, a first segment, a second segment, and a third segment. The first segment extends radially from the hub in a first direction. The second segment extends radially from the hub in a second direction different from the first direction. The third segment extends radially from the hub in a third direction different from the first direction and the second direction. When inflated in response to a sensed impact of the vehicle, the first segment, the second segment, and the third segment may extend from the hub between occupants of the vehicle to separate the occupants during the impact of the vehicle.

16 Claims, 6 Drawing Sheets

(56) References Cited

U.S. PATENT DOCUMENTS

| | | | | |
|---|---|---|---|---|
| 2004/0174003 | A1* | 9/2004 | Dominissini | B60R 21/233 |
| | | | | 280/729 |
| 2004/0188988 | A1* | 9/2004 | Wipasuramonton | B60R 21/214 |
| | | | | 280/730.1 |
| 2009/0121462 | A1* | 5/2009 | Rick | B60R 21/206 |
| | | | | 280/729 |
| 2009/0295131 | A1* | 12/2009 | Kim | B60R 21/214 |
| | | | | 280/730.1 |
| 2013/0069348 | A1* | 3/2013 | Choi | B60R 21/214 |
| | | | | 280/730.2 |
| 2015/0191143 | A1* | 7/2015 | Faruque | B60R 21/261 |
| | | | | 280/730.2 |
| 2016/0031401 | A1* | 2/2016 | Jaradi | B60R 21/015 |
| | | | | 701/45 |

* cited by examiner

VEHICLE AIRBAG INCLUDING HUB AND SEGMENTS EXTENDING RADIALLY FROM THE HUB

BACKGROUND

Vehicles may include a variety of airbag assemblies deployable during vehicle impacts to absorb energy from occupants of the vehicles during the impact. The airbag assembly may include an airbag and an inflator in communication with an inflation chamber of the airbag. The airbag may, for example, be formed of fabric. The inflator may inflate the airbag with an inflation medium to inflate the airbag from an uninflated position to an inflated position. The vehicle may include an impact sensing system in communication with the airbag assembly. The impact sensing system may sense a vehicle impact and instruct the inflator to inflate the airbag when a vehicle impact is sensed. There remains an opportunity to design an airbag that decreases the likelihood of occupants of the vehicle from colliding with one another during a vehicle impact.

DETAILED DESCRIPTION

With reference to the Figures, wherein like numerals indicate like parts throughout the several views, an airbag 10 for a vehicle 12 includes a hub 14 and a first segment 16, a second segment 18, and a third segment 20 each extending radially from the hub 14. With reference to FIGS. 1-5, the first segment 16 extends radially from the hub 14 in a first direction D1. The second segment 18 extends radially from the hub 14 in a second direction D2 different from the first direction D1. The third segment 20 extending radially from the hub 14 in a third direction D3 different from the first direction D1 and the second direction D2.

As set forth further below, the airbag 10 may be inflated to an inflated position, e.g., in response to a sensed impact of the vehicle 12, and the first segment 16, the second segment 18, and the third segment 20 may extend from the hub 14 between occupants (not shown) of the vehicle 12 when the airbag 10 is in the inflated position to separate the occupants during the impact of the vehicle 12. In other words, the first segment 16, the second segment 18, and/or the third segment 20 may reduce the likelihood of the occupants impacting each other during the impact of the vehicle 12. As set forth further below, the vehicle 12 may be an autonomous vehicle, in which the occupants may face each other during operation of the vehicle 12.

With reference to FIGS. 1-3 and 5, the vehicle may include front seats 22, 24 arranged in a front row 26 and rear seats 28, 30 arranged in a rear row 32. The vehicle 12 shown in FIGS. 1-3 and 5, for example, includes two front seats 22, 24, i.e., a left front seat 22 and a right front seat 24, and two rear seats 28, 30, i.e., a left rear seat 28 and a right rear seat 30. However, the vehicle 12 may include any number of seats in any suitable position, and any of the seats may be arranged in one or more rows.

Figure 2:
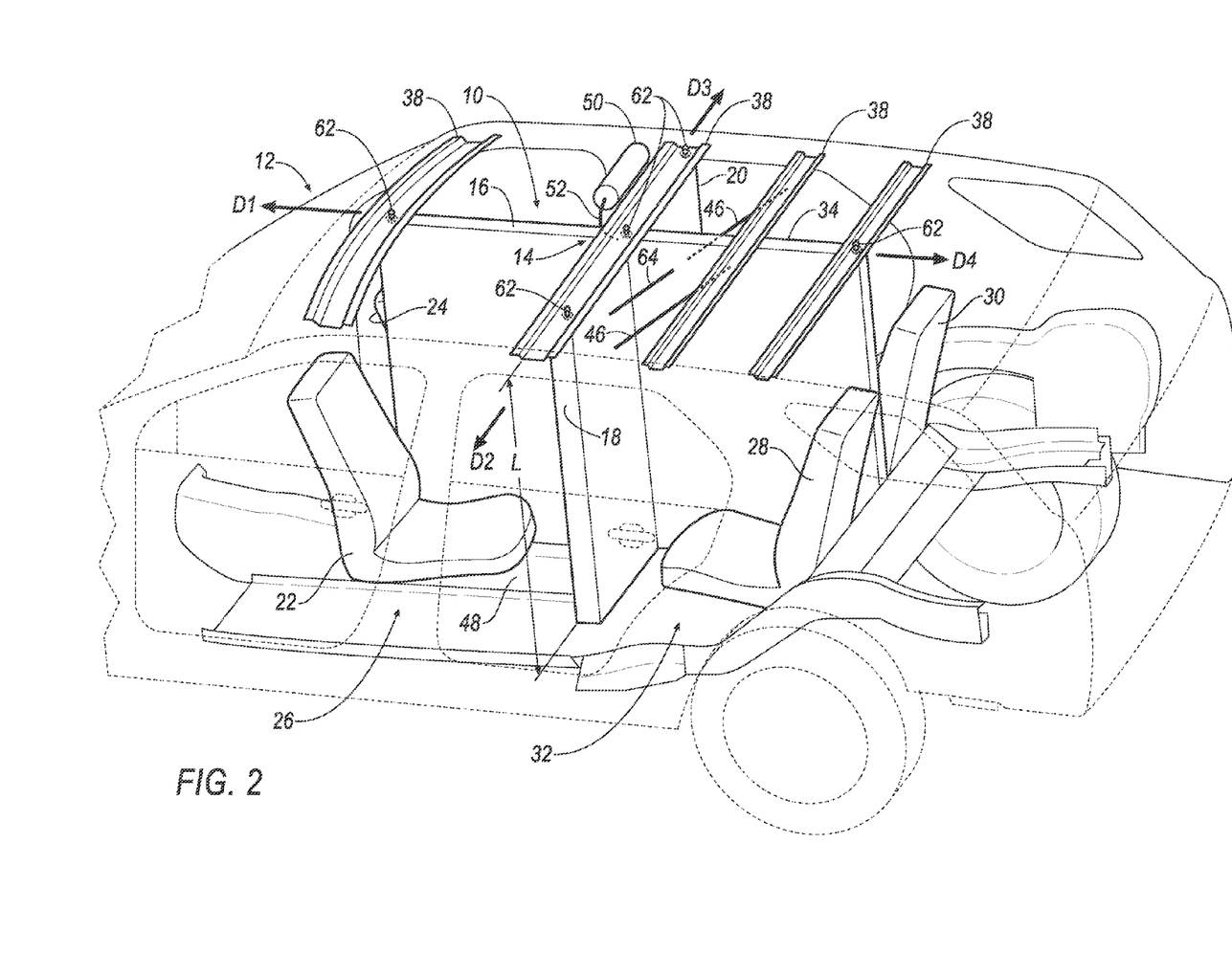
FIG. 2 is a perspective view of the vehicle including the airbag in an inflated position.
Figure 3:
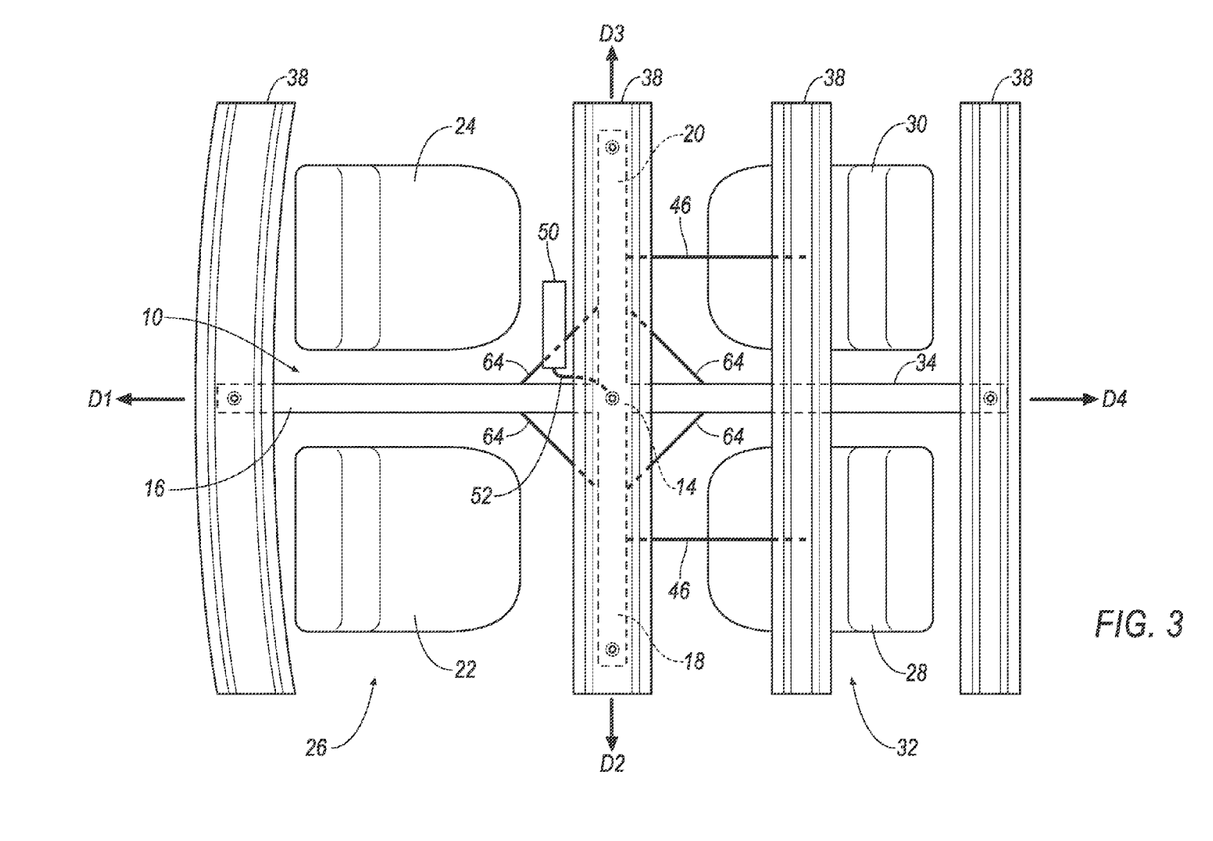
FIG. 3 is a top view of a portion of the vehicle including cross-members of a roof of the vehicle and the airbag mounted to the cross-members.
Figure 5:
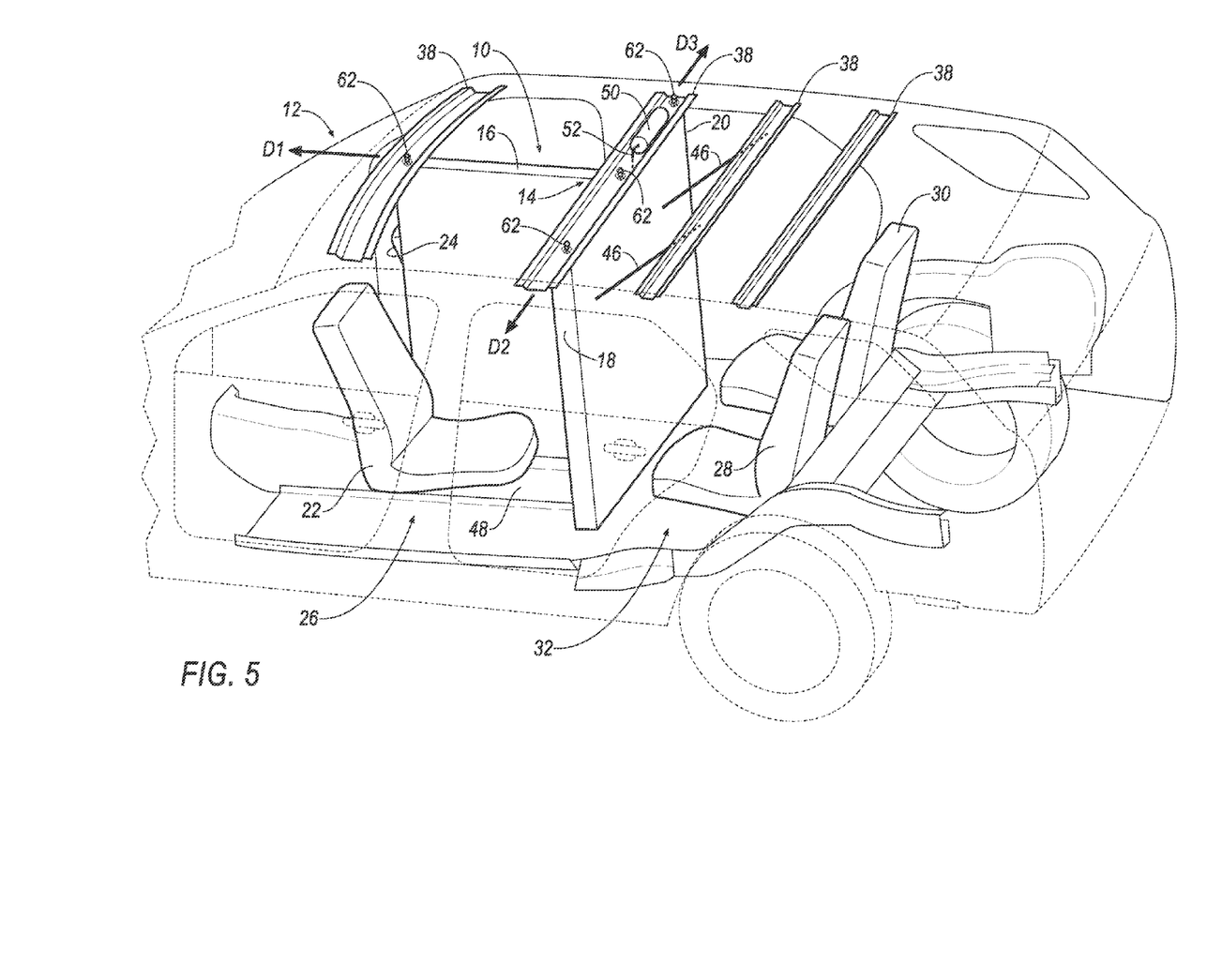
FIG. 5 is a perspective view of the vehicle with another embodiment of the airbag in the inflated position.

With reference to FIGS. 2, 3, and 5, in the inflated position, the hub 14 may be disposed between the front row 26 and the rear row 32. The hub 14 may be positioned on a fore-aft axis centered between the front seats 22, 24 and the rear seats 28, 30, e.g., centered in a cross-vehicle direction.

The first segment 16, the second segment 18, and the third segment 20 may be inflatable between the seats. In other words, in the inflated position, the first segment 16, second segment 18, and third segment 20 may extend from the hub 14 between the seats. Specifically, the first segment 16 may be inflatable between the left front seat 22 and the right front seat 24 to separate occupants of the left front seat 22 and the right front seat 24 during an impact of the vehicle 12. In other words, in the inflated position, the first segment 16 may extend from the hub 14 between the left front seat 22 and the right front seat 24.

The second segment 18 may be inflatable between the front row 26, e.g., the left front seat 22, and the left rear seat 28 to separate occupants of the front row 26, e.g., the left front seat 22, and the left rear seat 28 during an impact of the vehicle 12. In other words, in the inflated position, the second segment 18 may extend from the hub 14 between the front row 26, e.g., the left front seat 22, and the left rear seat 28. Specifically, in the inflated position, the first segment 16 may extend from the hub 14 in the first direction D1, and the second segment 18 may extend from the hub 14 in the second direction D2. The first direction D1 may be substantially perpendicular to the second direction D2 in the uninflated position and/or the inflated position, as shown in FIGS. 1-5. Specifically, the material of the airbag 10 may be flexible and rapidly inflated, and the position of the first segment 16 and second segment 18 may deviate from the first direction D1 and the second direction D2, respectively, during rapid inflation to the inflated position and/or when impacted by an occupant.

The third segment 20 may be inflatable between the front row 26, e.g., the right front seat 24, and the right rear seat 30 to separate occupants of the front row 26, e.g., the right front seat 24, and the right rear seat 30 during an impact of the vehicle 12. In other words, in the inflated position, the third segment 20 may extend from the hub 14 between the front row 26, e.g., the right front seat 24, and the right rear seat 30. Specifically, in the inflated position, the second segment 18 may extend from the hub 14 in the second direction D2, and the third segment 20 may extend from the hub 14 in the third direction D3. The third direction D3 may be substantially parallel to the second direction D2 of the second segment 18, and may be substantially perpendicular to the first direction of the first segment 16 in the uninflated position and/or the inflated position, as shown in FIGS. 1-5. Specifically, as set forth above, the material of the airbag 10 may be flexible and rapidly inflated, and the position of the first segment 16, second segment 18, and third segment 20 may deviate from the first direction D1, second direction D2, and third direction D3, respectively, during rapid inflation to the inflated position and/or when impacted by an occupant.

As shown in FIGS. 1-4, the airbag may include a fourth segment 34 extending radially from the hub 14 in a fourth direction D4 different than the first direction D1, the second direction D2, and the third direction D3. The fourth segment 34 may be inflatable between the left rear seat 28 and the right rear seat 30 to separate occupants of the left rear seat 28 and the right rear seat 30. In other words, in the inflated position, the fourth segment 34 may extend from the hub 14 between the left rear seat 28 and the right rear seat 30. Specifically, the fourth direction D4 of the fourth segment 34 may be substantially parallel to the first direction D1, and may be substantially perpendicular to the second direction D2 and the third direction D3 in the uninflated position and/or the inflated position, as shown in FIGS. 1-4. Specifically, as set forth above, the material of the airbag 10 may be flexible and rapidly inflated, and the position of the first segment 16, second segment 18, third segment 20, and fourth segment 34 may deviate from the first direction D1, second direction D2, third direction D3, and fourth direction D4, respectively, during rapid inflation to the inflated position and/or when impacted by an occupant.

As set forth above, the airbag 10 shown in FIGS. 1-4 include the first segment 16, the second segment 18, the third segment 20, and the fourth segment 34, e.g., are X-shaped as shown in FIGS. 1-4. Alternatively, the airbag 10 shown in FIG. 5, for example, includes the first segment 16, the second segment 18, and the third segment 20, without the fourth segment 34, e.g., may be T-shaped as shown in FIG. 5. In this configuration shown in FIG. 5, the rear row 32 may be a bench seat on which an occupant may be seated in any variety of cross-vehicle locations. The configuration of the airbag 10 in FIGS. 2-4, and the configuration of the airbag 10 in FIG. 5, are shown for example, and the airbag 10 may include any suitable number of segments extending from the hub 14 in any suitable direction.

The hub 14 may be an intersection of the first segment 16, the second segment 18, the third segment 20, and the fourth segment 34, as shown in the figures. Alternatively, the hub 14 may be have any suitable size and shape from which the first segment 16, the second segment 18, the third segment 20, and the fourth segment 34 radiate. The hub 14, the first segment 16, the second segment 18, the third segment 20, and the fourth segment 34 may be formed by any combination of one or more panels (not numbered) connected in any suitable manner, e.g., stitching.

Figure 1:
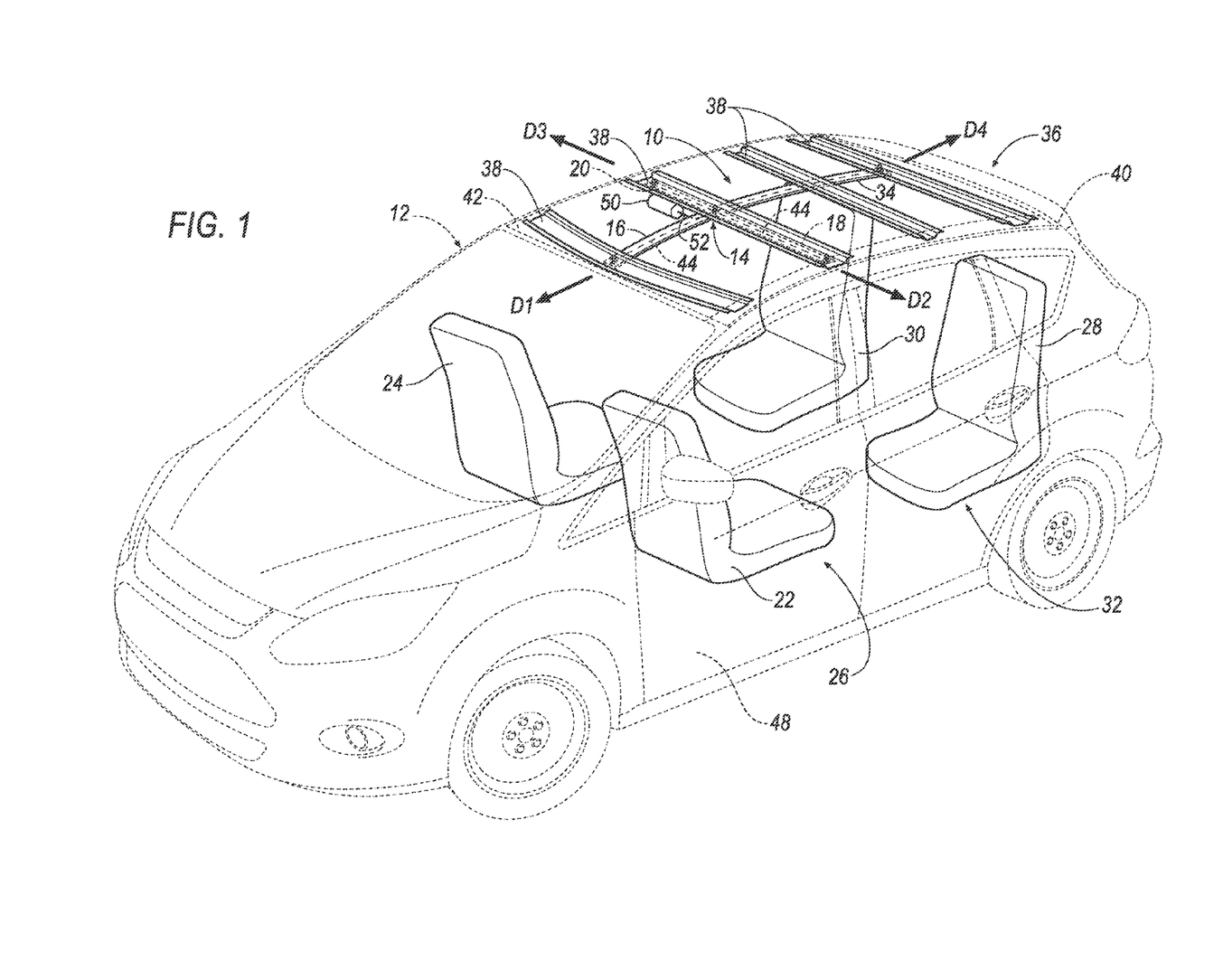
FIG. 1 is a perspective view of a vehicle including an airbag in an uninflated position.
Figure 4:
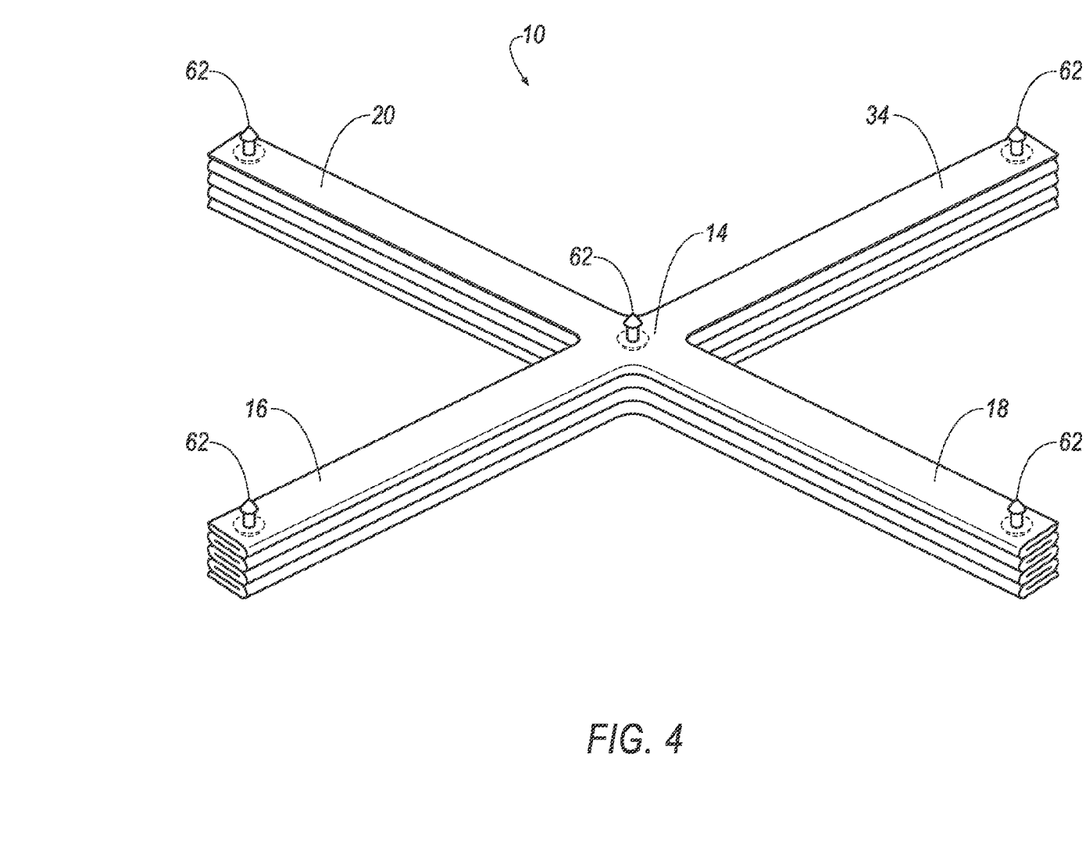
FIG. 4 is a perspective view of the airbag in the uninflated position.

With reference to FIGS. 1 and 4, in the uninflated position, for example, the airbag 10, i.e., the hub 14, first segment 16, second segment 18, third segment 20, and fourth segment 34, may be folded and/or bunched in a common plane. For example, in the uninflated position, the first segment 16, the second segment 18, the third segment 20, the fourth segment 34 may extend from the hub 14 in the first direction D1, the second direction D2, the third direction D3, and the fourth direction D4, respectively. The airbag 10 may be X-shaped in the uninflated position, as shown in FIG. 4.

The airbag 10 may be formed of any suitable type of material, e.g., from a woven polymer. For example, the airbag 10 may be formed of woven nylon yarn, e.g., nylon 6, 6. Other suitable examples include polyether ether ketone (PEEK), polyetherketoneketone (PEKK), polyester, or any other suitable polymer. The woven polymer may include a coating, such as, for example, silicone, neoprene, urethane, etc. For example, the coating may be polyorgano siloxane.

With reference to FIG. 1, the vehicle may include a roof 36 including cross-members 38 and a roof panel 40 supported on the cross-members 38. The roof 36 may support the airbag 10. For example, the airbag 10 may be connected to the cross-members 38, as shown in FIGS. 1-3 and 5. As shown in FIGS. 2 and 5, the airbag 10 may be inflatable away from the roof 36, e.g., in a downwardly vertical direction, to the inflated position.

The airbag 10 may be supported on the roof 36, e.g., the cross-members 38, in any suitable manner. For example, the airbag 10 may include clips 62, as shown in FIGS. 1-5, engaged with the cross-members 38, as shown in FIGS. 1-3 and 5. The clips 62 may be of any suitable type, e.g., including fasteners, Christmas tree clips, pins, etc.

With reference to FIG. 2, the airbag 10 may extend from the roof 36 a length L. For example, the length L may extend from the roof 36 to a floor 48 of the vehicle 12. In other words, the airbag 10 may extend from the roof 36 to the floor 48 in the inflated position. Specifically, the hub 14, the first segment 16, the second segment 18, the third segment 20, and the fourth segment 34 may extend from the roof 36 to the floor 48, as shown in FIG. 2. Alternatively, one or more of the hub 14, the first segment 16, the second segment 18, the third segment 20, and the fourth segment 34 may extend from the roof a distance less than the length L from the roof 36 to the floor 48.

As shown in FIG. 1, the vehicle 12 may include a headliner 42 adjacent to the roof 36. The airbag 10 may be disposed between the roof 36 and the headliner 42. The headliner 42 may include a tear seam 44. The airbag 10 may be disposed between the tear seam 44 and the roof 36. Upon inflation of the airbag 10, the airbag 10 may break the headliner 42 at the tear seam 44, and may protrude through the tear seam 44 to the inflated position. In the alternative, or in addition to being mounted to the roof 36, the airbag 10 may be mounted to the headliner 42.

As shown in FIGS. 2, 3, and 5, the vehicle 12 may include at least one tether 46 extending from the roof 36 to the airbag 10. The tether 46 may be fixed to the roof 36 and to the airbag 10 to position the first segment 16, the second segment 18, the third segment 20, and/or the fourth segment 34 during inflation. The tether 46 may be of any suitable size, shape, and material. For example, the tether 46 may be formed of the same type of material as the airbag 10.

The airbag 10 may include at least one tether 64 fixed to at least any two of the first segment 16, the second segment 18, the third segment 20, and the fourth segment 34. The tether 64 may position the first segment 16, the second segment 18, the third segment 20, and/or the fourth segment 34 relative to each other as the airbag 10 is inflated and/or during impact from an occupant. As one example, as shown in FIG. 3, the airbag 10 may include four tethers 64, i.e., connecting the first segment 16 and the second segment 18, connecting the second segment 18 and the third segment 20, connecting the third segment 20 and the fourth segment 34, and connecting the fourth segment 34 to the first segment 16. However, the airbag 10 may include any suitable number of tethers 64 connecting any suitable ones of the first segment 16, second segment 18, third segment 20, and/or fourth segment 34. The tether 64 may be of any suitable size, shape, and material, and may be positioned at any suitable location. For example, the tether 64 may be formed of the same type of material as the airbag 10.

As set forth above, the vehicle 12 may be an autonomous vehicle. In other words, the vehicle 12 may be autonomously operated such that the vehicle 12 may be driven without constant attention from a driver, i.e., the vehicle 12 may be self-driving without human input. In this instance, for example, the front seats 22, 24 may be supported by the floor 48 of the vehicle 12 and may be rotatable relative to the floor 48 about an axis transverse to the floor 48. Specifically, the front seats 22, 24 may be rotatable to face the rear seats 28, 30, as shown in FIG. 1, for example.

As shown in FIGS. 1-3 and 5-6, the airbag 10 may include an inflator 50 in fluid communication with an inflation chamber (not numbered) of the airbag 10. The inflator 50 expands the airbag 10 with an inflation medium, such as a gas, to move the airbag 10 from the uninflated position to the inflated position. The inflator 50 may be, for example, a pyrotechnic inflator that uses a chemical reaction to drive the inflation medium into the airbag 10. Alternatively, the inflator 50 may be, for example, a cold-gas inflator that, when activated, ignites a pyrotechnic charge that creates an opening for releasing the pressurized inflation medium to the airbag 10 via a fill tube 52. Alternatively, the inflator 50 may be of any suitable type, for example, a hybrid inflator.

The inflator 50 may be mounted to the roof 36 and/or the headliner 42. For example, as shown in FIGS. 1-3, the inflator 50 may be mounted between to either the roof panel 40 or the headliner 42. Alternatively, as shown in FIG. 5, the inflator may be mounted to the cross-member 38. Alternatively, for example, the inflator 50 may be mounted to a pillar of the vehicle 12, e.g., an A-pillar, B-pillar, C-pillar, etc. The inflator 50 may be connected to the inflation chamber through the hub 14, the first segment 16, the second segment 18, the third segment 20, and/or the fourth segment 34.

Figure 6:
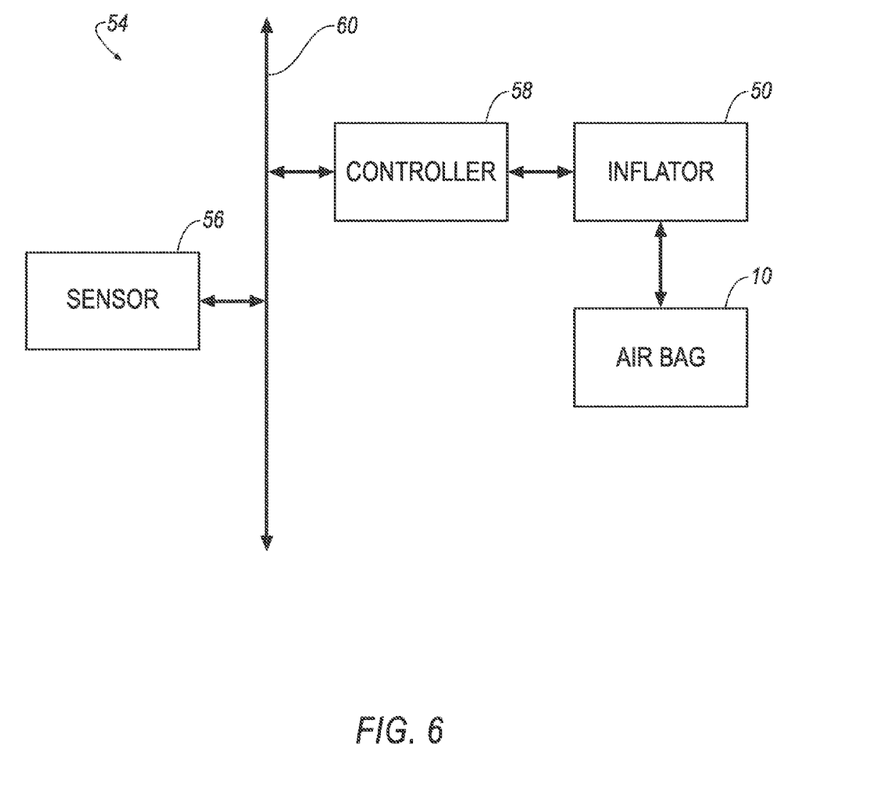
FIG. 6 is a schematic of a restraints system of the vehicle.

With reference to FIG. 6, the vehicle 12 may include a restraints system 54. The restraints system 54 may include at least one sensor 56 for sensing impact of the vehicle 12, and a controller 58 in communication with the sensor 56 and the inflator 50 for activating the inflator 50, e.g., for providing an impulse to a pyrotechnic charge of the inflator 50, when the sensor 56 senses an impact of the vehicle 12. Alternatively or additionally to sensing impact, the restraints system 54 may be configured to sense impact prior to impact, i.e., pre-impact sensing. The sensor 56 may be of any suitable type, e.g., using radar, lidar, and/or a vision system. The vision system may include one or more cameras, CCD image sensors, and/or CMOS image sensor, etc.

The controller 58 may be a microprocessor-based processor. The controller 58 may include a processor, memory, etc. The memory of the controller 58 may store instructions executable by the processor. The sensor 56 is in communication with the controller 58 to communicate data to the controller 58. Based on the data communicated by the sensor 56, the controller 58 instructs the inflator 50 to activate.

The restraints system 54 may transmit signals through a communication network 60 (such as a controller area network (CAN) bus), Ethernet, and/or by any other wired or wireless communication network. The controller 58 may use information from the communication network 60 to control the activation of the inflator 50. The inflator 50 may be connected to the controller 58, as shown in FIG. 6, or may be connected directly to the communication network 60.

In operation, the airbag 10 is in the uninflated position, as shown in FIG. 1, under normal operating conditions of the vehicle 12. When the sensor 56 senses an impact of the vehicle 12, the restraints system 54 triggers the inflator 50 to inflate the airbag 10 with the inflation medium from the uninflated position to the inflated position.

The disclosure has been described in an illustrative manner, and it is to be understood that the terminology, which has been used is intended to be in the nature of words of description rather than of limitation. Many modifications and variations of the present disclosure are possible in light of the above teachings, and the disclosure may be practiced otherwise than as specifically described.

What is claimed is:

1. An airbag inflatable from an uninflated position to an inflated position, the airbag comprising:
    a hub;
    a first segment extending radially from the hub in a first direction in the uninflated position;
    a second segment extending radially from the hub in a second direction different from the first direction in the uninflated position;
    a third segment extending radially from the hub in a third direction different from the first direction and the second direction in the uninflated position; and
    a tether extending from at least one of the first segment, the second segment, and the third segment for connection to a roof of a vehicle.

2. The airbag as set forth in claim 1, wherein the second direction is substantially parallel to the third direction.

3. The airbag as set forth in claim 2, wherein the first direction is substantially perpendicular to the second direction.

4. The airbag as set forth in claim 1, further comprising a fourth segment extending radially from the hub in a fourth direction different from the first direction, the second direction and the third direction.

5. The airbag as set forth in claim 4, wherein the second direction is substantially parallel to the third direction.

6. The airbag as set forth in claim 5, wherein the first direction is substantially parallel to the fourth direction.

7. The airbag as set forth in claim 6, wherein the first direction is substantially perpendicular to the second direction.

8. The airbag as set forth in claim 1, wherein the first segment, the second segment, the third segment, and the hub are inflatable from an uninflated position to an inflated position and are folded in a common plane in the uninflated position.

9. The airbag as set forth in claim 1, further comprising a tether extending from the first segment to the second segment.

10. A vehicle comprising:
    two front seats arranged in a front row;
    a rear seat and a second rear seat each spaced from the front row;
    a roof and a headliner adjacent the roof;
    an airbag disposed between the roof and the headliner in an uninflated position, the airbag including a first segment, a second segment, and a hub;
    the first segment extending radially from the hub in the uninflated position and inflatable between the front seats;
    the second segment extending radially from the hub in the uninflated position and inflatable between the front row and the rear seat;
    a third segment extending radially from the hub in the uninflated position and inflatable between the front row and the second rear seat; and
    a tether extending from the roof to at least one of the first segment, the second segment, and the third segment.

11. The vehicle as set forth in claim 10, wherein the airbag includes a fourth segment extending radially from the hub in the uninflated position and inflatable between the rear seat and the second rear seat.

12. The vehicle as set forth in claim 10, wherein the first segment and the second segment are folded in a common plane in the uninflated position.

13. The vehicle as set forth in claim 10, wherein the roof supports the airbag.

14. The vehicle as set forth in claim 13, wherein the headliner includes a tear seam, and wherein the airbag is disposed between the tear seam and the roof.

15. The vehicle as set forth in claim 10, wherein the airbag includes a tether extending from the first segment to the second segment.

16. The vehicle as set forth in claim 10, further comprising a floor, the front seats being rotatable relative to the floor about an axis transverse to the floor.

\* \* \* \* \*